J. C. BARBER.
CENTER BEARING FOR CARS.
APPLICATION FILED FEB. 18, 1909.
969,444.
Patented Sept. 6, 1910.
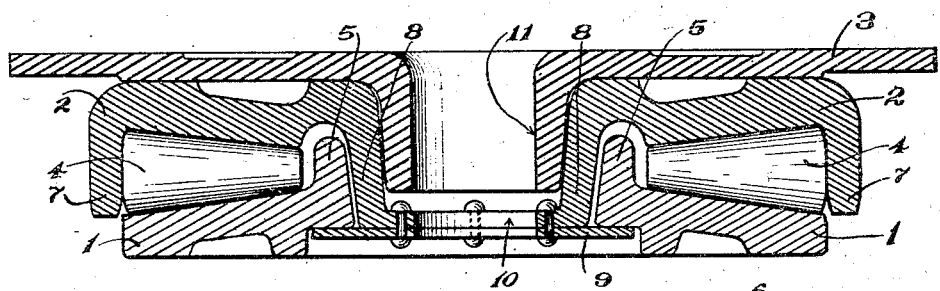
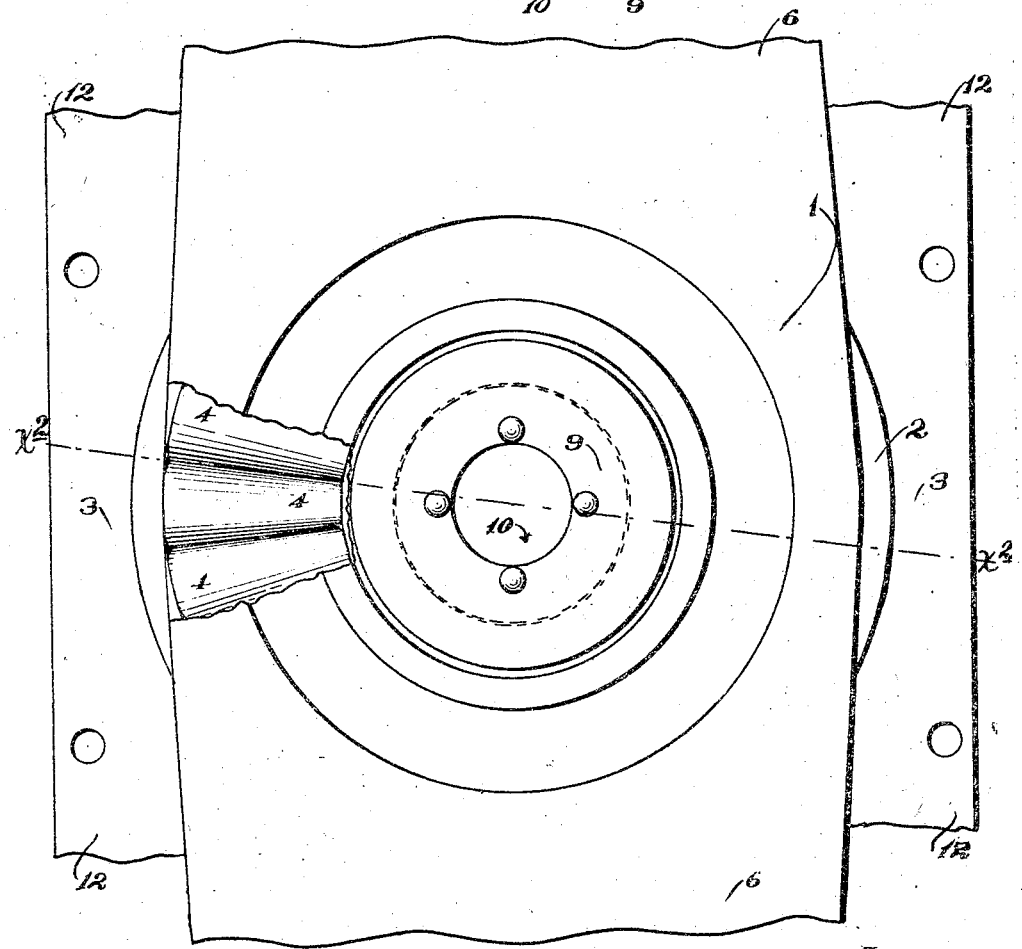

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CENTER-BEARING FOR CARS.

969,444.  Specification of Letters Patent.  Patented Sept. 6, 1910.

Application filed February 18, 1909.  Serial No. 478,686.

*To all whom it may concern:*

Be it known that I, JOHN C. BARBER, a citizen of the United States, residing at Chicago, in the county of Cook and State of Illinois, have invented certain new and useful Improvements in Center-Bearings for Cars; and I do hereby declare the following to be a full, clear, and exact description of the invention, such as will enable others skilled in the art to which it appertains to make and use the same.

My invention has for its object to provide an improved center bearing for cars, and to this end, it consists of the novel devices and combinations of devices hereinafter described and defined in the claims.

In the accompanying drawings which illustrate this invention, like characters indicate like parts throughout the several views.

Referring to the drawings: Figure 1 is a bottom plan view with parts broken away showing the improved center bearing; and Fig. 2 is a vertical section taken on the line $x^2\ x^2$ of Fig. 1.

As the salient feature of the present invention, the center bearing is made up of upper and lower roller bearing plates, interposed rollers, and a so-called anchoring plate connected to one of the roller bearing plates by telescoping hub portions. This permits the roller bearings proper, to-wit, the upper and lower bearing plates and the interposed rollers, to be of standard construction, requiring only the so-called anchoring plate to be made in varying forms to suit cars of different design, such as employed on different roads, or frequently by the same roads.

The invention as preferably constructed, and illustrated in the drawings, is as follows: The numerals 1 and 2 indicate respectively, the lower and upper roller bearing plates, and the numeral 3 indicates the so-called anchoring plate. The roller bearing plates 1 and 2 are formed with outwardly diverging annular roller bearing surfaces between which, conical bearing rollers 4 are interposed in radial arrangement and in close contact. The lower roller bearing plate 1 is formed with a large axial passage and with an upwardly extended hub flange 5 surrounding said passage; and is also formed with a base flange 6 adapting it to be bolted to a truck bolster, not shown. The upper roller bearing plate 2 is formed with a depending annular thrust flange 7 with which the rounded outer ends of the bearing rollers 4 engage, and is also formed with a central approximately cylindrical, but preferably slightly tapered, hub flange 8, that telescopes through and works pivotally within the axial passage of the lower roller bearing plate 1. An annular retaining ring 9 shown as riveted to an inwardly extended annular portion of the hub flange 8 projects under the hub flange 5 of the lower roller bearing plate 1, and locks the two roller bearing plates together, while permitting the pivotal movements thereof in respect to each other. The roller bearing proper is thus connected in an assembled condition, and the rollers will be held in place even when the said center bearing proper is removed from working position. The lower in-turned portion of the hub flange 8, and the retaining ring 9 are formed with a central passage 10, through which a king bolt or center pin, not shown, may be passed. The anchoring plate 3 rests loosely upon the upper portion of the upper roller bearing plate 2, and is provided with a sleeve like hub 11 that depends therefrom and loosely telescopes into the hub flange 8 of said upper roller bearing plate, with its axial passage alined with the said passage 10. Also, this anchoring plate 3 is provided with extended flanges 12 that are adapted to be bolted to the car bolster, not shown. If desired, of course, this anchoring plate 3 may be positively secured by bolts, rivets or otherwise, to the upper roller bearing plate 2, but in practice this is not necessary, because the frictional engagement between the two plates 2 and 3, being much greater than the friction between the rollers and the upper bearing plate 2, will cause the two said plates 2 and 3 to rotate together in service.

In practice, the roller bearing plates 1 and 2, which as above stated, are made in standard sizes, are drop forgings preferably of steel, and these afford very hard bearing surfaces for the rollers; and the anchoring plate 3 is usually made of cast steel and is the only part of the bearing that requires special designing to adapt the bearing to the cars of different roads or different designs. This does away with a very large expense which would otherwise be incident to adapting the entire bearing to different car construction.

It will, of course, be understood, that the center bearing described, might be turned upside down, with a so-called anchoring plate at the bottom of the bearing, but by far the best results are obtained by placing this anchoring plate on top of the upper center bearing as illustrated in Fig. 2 of the drawing. It will therefore, be understood, that the center bearing is capable of various other modifications within the scope of this invention.

What I claim is:

1. A center bearing comprising upper and lower roller bearing plates and interposed rollers, one of said bearing plates having a sleevelike hub telescoped through the other bearing plate and provided with a projecting retaining ring or flange holding the said plates interlocked but free for rotation, and an anchoring plate having a sleevelike hub telescoped into the sleevelike hub of the engaged bearing plate, and the sleevelike hub of the said anchoring plate affording an extended bearing for a king bolt or center pin, substantially as described.

2. A center bearing comprising upper and lower center bearing plates and interposed radially disposed rollers, one of said bearing plates having a sleevelike hub telescoped through the other bearing plate and having, also, an outer thrust flange for engagement of the ends of the rollers, the said sleevelike hub having an inwardly extended flange and a retaining ring riveted thereto and serving to hold the said bearing plates interlocked but free for rotation, and an anchoring plate having a sleevelike hub telescoped into the sleevelike hub of said bearing plate, with the passage thereof alined with the passages through said inwardly extended flange and retaining ring, the said alined passages affording an extended seat for a king bolt, or center pin, substantially as described.

In testimony whereof I affix my signature in presence of two witnesses.

JOHN C. BARBER.

Witnesses:
  E. W. WEBB,
  LEE W. BARBER.